United States Patent [19]
Seguin

[11] Patent Number: 5,210,768
[45] Date of Patent: May 11, 1993

[54] MULTI-SLAB SOLID STATE LASER SYSTEM

[76] Inventor: Herb J. J. Seguin, 12639 - 52 Ave., Edmonton, Alberta, Canada, T6H 0P6

[21] Appl. No.: 838,038

[22] Filed: Feb. 21, 1992

[51] Int. Cl.$^5$ .............................................. H01S 3/08
[52] U.S. Cl. ........................................ 372/92; 372/95; 372/66; 372/18; 372/34
[58] Field of Search ....................... 372/92, 95, 69, 70, 372/18, 34, 35, 66

[56] References Cited

U.S. PATENT DOCUMENTS

| | | | |
|---|---|---|---|
| 4,677,636 | 6/1987 | Laudenslager et al. | 372/68 |
| 4,751,716 | 6/1988 | Ream et al. | 372/66 |
| 4,845,721 | 7/1989 | Hoffmann | 372/66 |
| 5,029,173 | 7/1991 | Seguin | 372/23 |

Primary Examiner—Leon Scott, Jr.
Attorney, Agent, or Firm—Anthony R. Lambert

[57] ABSTRACT

The laser system features a plurality of thin solid-state gain channels mounted radially about a common axis. These gain channels may be excited by multiple flash-lamps or by extended arrays of light-emitting-diodes. The gain channels are also mounted in a parallel configuration within a single optical resonator and thereby share a common cavity mode. The resonator may be a stable resonator, a conventional unstable resonator, or a toric resonator. Each resonator configuration may be externally phase-locked via external reference oscillator injection or by self-injection via an internally generated master oscillator. When incorporating a very large number of gain channels, the concept provides an efficient and inexpensive means for constructing extremely high powered, optically-pumped, lasers in very small physical packages. The technique, which is applicable to a wide variety of laser gain media, either solid or liquid, permits high average power operation to be achieved without serious beam quality degradation. Typical solid state gain media include Nd:YAG, Nd:Glass, GSGG, GGG and Alexandrite.

20 Claims, 10 Drawing Sheets

MULTI-SLAB SOLID STATE LASER SYSTEM

FIELD OF INVENTION

This invention relates to high powered laser systems, and in particular to multi-channel solid state laser systems.

BACKGROUND AND SUMMARY OF THE INVENTION

In recent years considerable interest has been shown in the development of solid state lasers featuring high average optical output power. Laser systems such as Nd:YAG and Nd:Glass have received particular attention, as a candidate for a moderately short wavelength energy source, to be utilized for more efficient laser materials processing. However scaling to higher average power has proven to be very difficult, especially if high efficiency and good beam quality are to be maintained.

Two particularly difficult power limiting problems in these solid-state systems have been non-uniform excitation and non-optimum waste heat removal from the active media. Such non-uniformities in excitation and cooling induce refractive index inhomogeneity within the gain media, thereby leading to serious degradation in beam quality and possibly even to fracture of the solid state gain material. In an effort to ameliorate such difficulties, an number of novel geometries for pumping and cooling solid state laser gain material have been proposed and implemented. Of particular note have been the "axial-gradient", "segmented", "slab" and "zig-zag" configurations developed in the mid 70s. See: E. Matovich, "The Axial Gradient Laser", Proc., Fourth DOD Conf. Laser Tech., San Diego, Jan. 1970, Vol. 1, pp. 311-362; W. F. Hagen, C. G. Young, D. W. Cuff, and J. E. Keefe, "Segmented Nd Glass Laser", Proc., Fourth DOD Conf. Laser Tech., San Diego, Jan. 1970, pp. 363-377; J. M. Eggleston, T. J. Kane, J. Unternahrer, and R. L. Byer, "Slab-Geometry Nd:Glass Laser Performance Studies", Optics Letts. Vol. 7, pp. 405-407, 1982; G. J. Hulme, and W. B. Jones, "Total Internal Reflection Face Pumped Laser: Concepts and Design Considerations", SPIE, Vol. 69, pp. 38-44, 1975.

Similar configurations, and more recent inside-pumped approaches have raised the average output power extractable from Nd:YAG devices well into the 1 kilowatt regime. See: J. L. Emmett, W. F. Krupke and W. R. Sooy, "Potential of High Average-Power Solid State Lasers", Lawrence Livermore National Laboratory report # UCRL-53571 and UC-21,22; Walter Koechner, "Solid-State Laser Engineering", Springer-Verlag Series in Optical Sciences, Chap. 7, Spring-Verlag; U. Wittrock and H. Weber, "Inside-pumped Nd:Yag Tube Laser", Optics Letts. Vol. 16, pp. 1092-1094, Jul., 1991.

The attainment of even these modest power levels has however come at considerable cost, and usually also at the expense of mode quality. These aspects follow directly from the fact that high average power has hitherto required the growing of very large, single crystal rods, slabs, or cylinders, for the gain medium. In this context, experience has shown that the growing of large crystal units is not only very expensive, but that the optical quality in such a single crystal extended volume gain medium is also compromised. As such, near diffraction limited performance, under high average power operating conditions, is not achieved.

Indeed most high average power Nd:YAG lasers operate at more than 50 times their diffraction limit. This aspect seriously degrades the focusability and brightness of the beam; thereby greatly reducing the effectiveness of the laser for high speed, deep penetration materials processing.

There is disclosed here an alternative method for the attainment of high average optical power output from a solid state laser system. The technique, which utilizes a multi-channel approach for the establishment of the gain medium, appears equally applicable to a wide variety of optically-pumped gain material, either single crystal or glass. The approach is an extension of the multiple gain channel with common unstable optical extraction configuration developed previously by the same inventor for gas lasers: H. J. J. Seguin, "Laser System With Multiple Radial Discharge Channels", U.S. Pat. No. 5,029,173, Jul., 1991.

Thus in one embodiment, there is provided a laser system in which plural pairs of solid state gain channels are arranged about and extend radially from a first common central axis within an enclosure. The active media within the gain channels are cooled by conduction cooling, for example by the circulation of fluids within the enclosure. Means adjacent the gain channels provide uniform laser excitation energy to the gain media, such laser excitation energy being in the form of optical radiation derived from a plurality of strategically positioned flashlamps or arrays of light-emitting diodes.

Optical extraction means having a second axis coinciding with the gain media common central axis are disposed about the pairs of gain channels and generate a common resonator mode for all the gain channels and extract laser energy from all of the gain channels simultaneously.

The means for extracting the laser energy may include an optical resonator having a common unstable cavity mode and a segmented annular output, and may include an output axicon mounted to receive the segmented annular output, (one beamlet from each gain channel), and compact it into a continuous annular output beam.

Means for injecting an externally generated reference oscillator signal provides simultaneous phase-locking of the plurality of gain channels, thereby yielding an a externally-injection-locked "MOPA" system, (Master-Oscillator Power-Amplifier), having a phase coherent output beam.

The effect of combining identical phase-locked beamlets from a plurality of gain channels into a single beam is such that, in the limit of a very large number of individual channels, the resultant combined output beam exhibits an exceptional uniformity of illumination and intensity profile, far superior to that of any individual beamlet. As such, the performance of a radial geometry laser with MOPA approaches that of an ideal source, with high stability and near diffraction limited optical quality, at high average power.

The gain channels may be mounted in a toric resonator, which may include an output compacting axicon for uniform intensity laser beam extraction along the centerline and means for injecting an externally generated reference oscillator signal into the toric resonator system, for providing simultaneous injection-phase-locking of the plurality of gain channels, thereby providing near diffraction limited optical performance at high output power level.

A separate solid state cylindrical gain section (rod) may be mounted along the common central axis and pumped with laser excitation energy from the plurality of surrounding flashlamps or light emitting diode arrays. A portion of the coherent optical laser output radiation, produced by the centrally mounted gain section (rod) may be fed back into the plurality of radially mounted gain channels, thus providing a self-phase-locking feature for each individual radial gain channel and thereby yielding a self-injection-locked "MOPA" system, featuring a combined phase coherent output beam of high stability and near diffraction limited optical quality with high average power.

In a still further embodiment of the laser system, the radial gain channels are provided with Brewster Angle end sections, such that the optical cavity mode propagation executes a Zig-Zag path through each of the individual gain channels.

BRIEF DESCRIPTION OF THE FIGURES

There will now be described preferred embodiments of the invention, with reference to the figures by way of example, in which figures like reference numbers denote like features, and in which.

DESCRIPTION OF PREFERRED EMBODIMENTS

Figure 1:
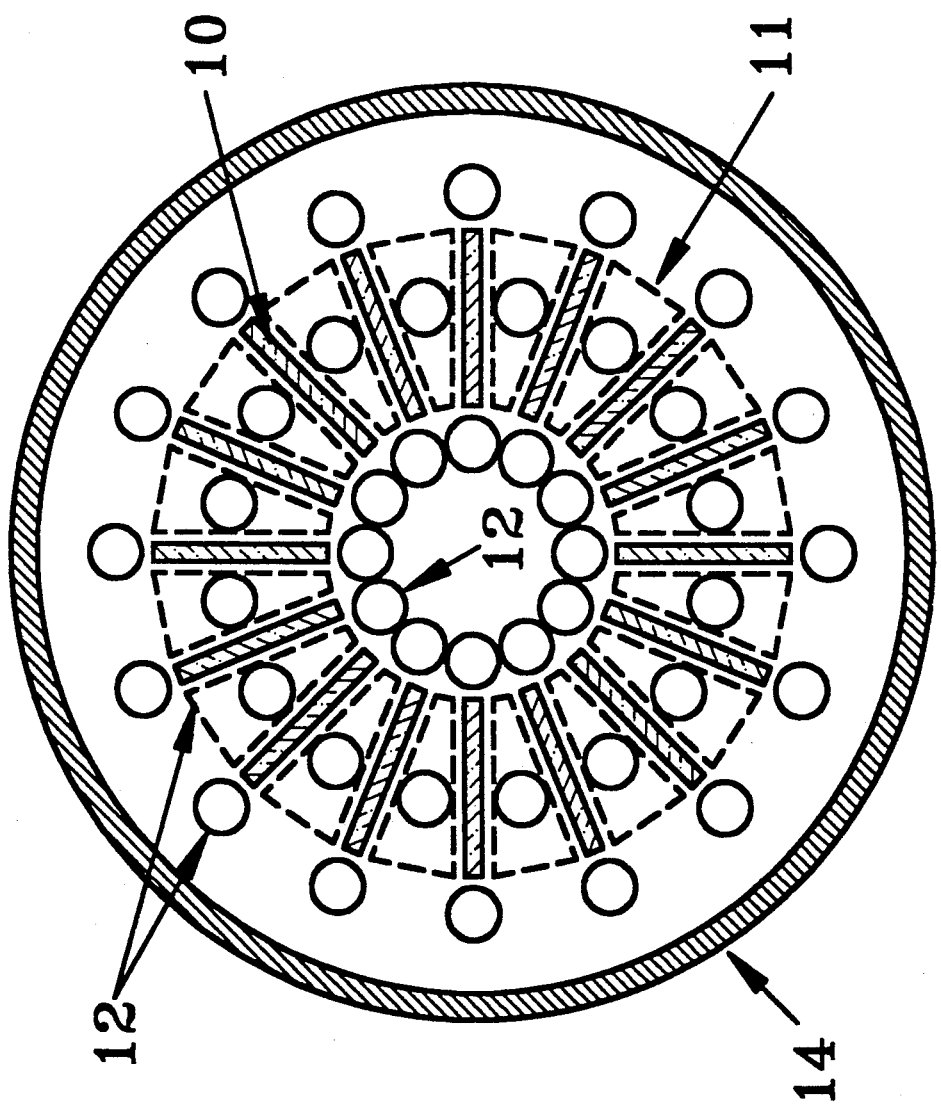
FIG. 1 is a cross-sectional schematic of an optically pumped, radial laser geometry, featuring a plurality of radially mounted gain channels, pumped by a large number of flashlamps or LED arrays.
Figure 2:
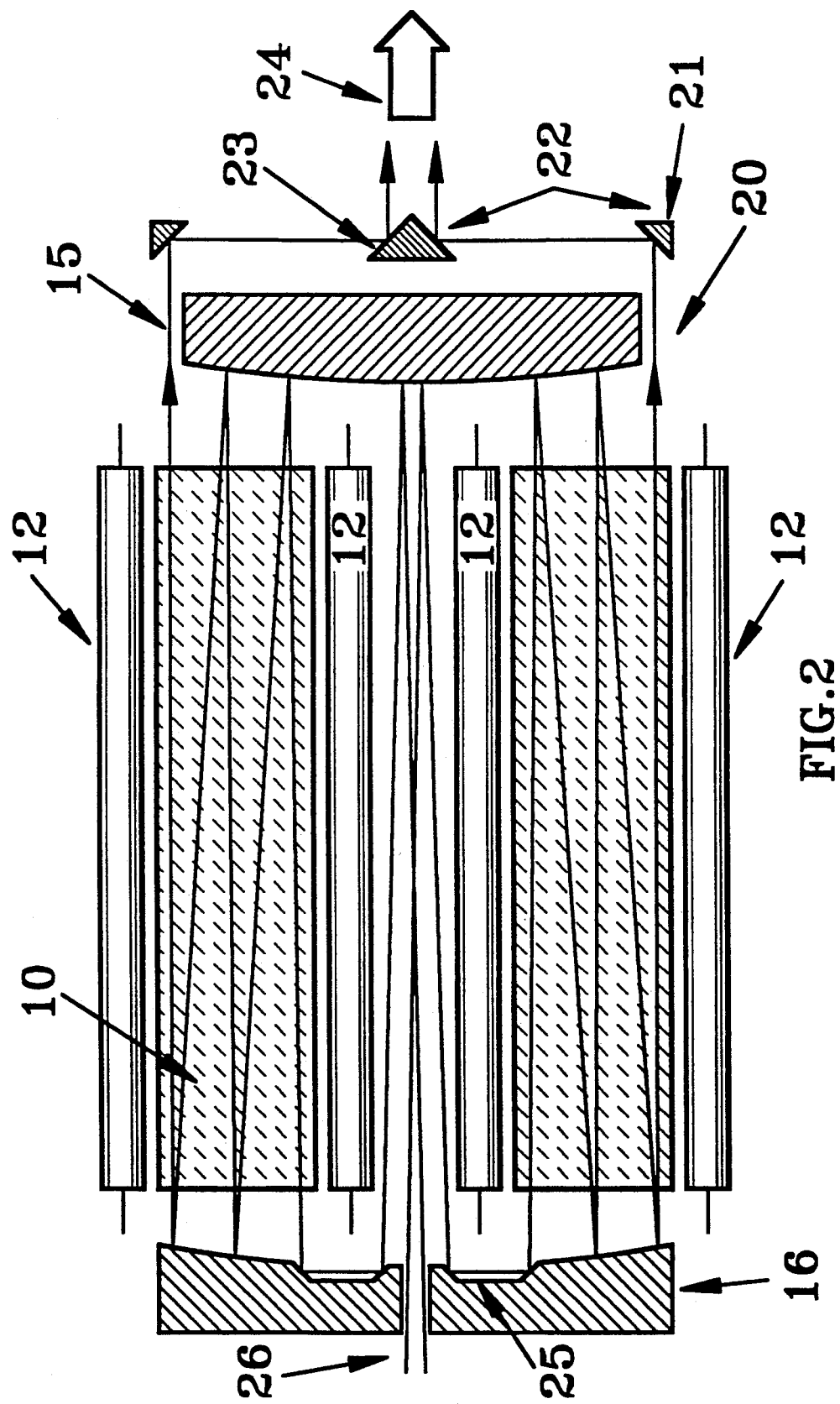
FIG. 2 is a plan view schematic diagram of an unstable optical resonator for use with an optically pumped radial laser system featuring a multiple radial gain channel geometry, and having provision for external reference oscillator injection, for external-phase-locking of said individual gain channels.

A first embodiment of a multi-gain channel radial laser geometry is illustrated in FIGS. 1 and 2. The device embodies a large number of long and wide, but very thin, solid state gain channels 10, typical solid state gain materials including Nd:YAG, Nd:Glass, GSGG, GGG, and Alexandrite, mounted both radially and concentrically about a common centrally axis within a water cooled reflecting enclosure 14.

Relatively uniform pumping of the individual gain channels 10 is achieved by placing a large number of flashlamps (or LED arrays) 12 forming means adjacent each gain channel for providing laser excitation energy to the material within the gain channel at strategic locations for example as shown on both the outer and inner peripheries of the gain channels and also within the pie shaped regions 11 between adjacent gain channels. Optical extraction means formed of mirrors 16 and 20 are disposed at either end of the enclosure and define a common cavity mode for light generated by the gain channels. In this manner, the individual solid state slabs function as multiple gain sections for the device, each contributing to a common cavity mode established within the resonator's primary and secondary mirrors 16 and 20 respectively. Cooling for both the gain media channels or slabs and the flashlamps or LED arrays is achieved via re-circulation of an appropriate heat-exchange fluid, either liquid or gas, throughout the inside of the enclosure between the flashlamps 12, gain channels 10 and any supporting structure (not shown). Cooling may also be obtained by using water jackets around the active elements of the laser and flowing water through the water jackets.

Figure 1B:
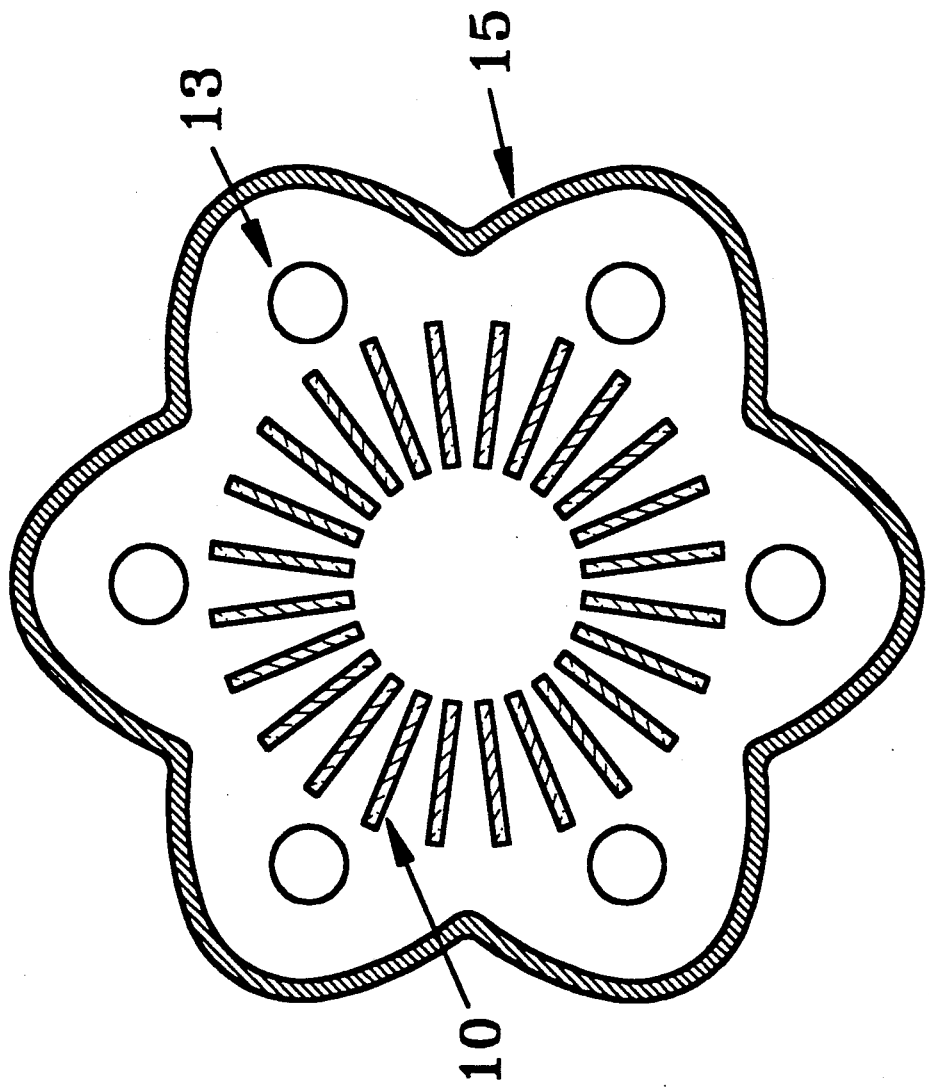
FIG. 1a is a cross-sectional schematic of an optically pumped, radial laser geometry, featuring a plurality of radially mounted gain channels, pumped by a few but very high power arc sources.

An alternative optical pumping system is shown in FIG. 1B. The plurality of flash lamps 12 in FIG. 1 have been replaced with fewer but very powerful vortex stabilized arc lamps 13, each fitted with a cylindrical parabolic reflector 15. In such a configuration, one may achieve even more uniform pumping of the slabs through utilization of optical scattering within the inter-slab cooling regions. This may be accomplished by means of mixing a suspension of small scattering particles with the re-circulated cooling fluid for the slabs. Alternatively, solid scattering elements may be mounted between the slabs.

Laser energy is extracted via the optical resonator configurations shown in FIGS. 2, 3, 5, 6 and 9. In FIG. 2, the optical resonator is defined by convex mirror 16 and concave mirror 20 disposed at opposite ends of the gain sections. Mirror 16 includes an annular recess 25 with slanted annular edges forming an axicon that guides the light from the central region at and adjacent the central axis into the gain channels. An annular mirror surface 21 and conical mirror surface 23 form part of an output axicon 22 placed adjacent the mirror 20. The output axicon 22 may be formed from an integral unit with slots cut at the appropriate locations for the individual beamlets output from the gain channels, in accordance with design principles well known in the art. In the normal unstable resonator configuration of FIG. 2, the cavity rays (illustrated by the lines 15) gradually "walk" radially outward towards the outer edges of the mirrors. Consequently, optical energy is extracted at the outer periphery of the secondary resonator mirror 20 as individual beamlets, which are then compacted into a single beam 24, via the annular mirror 21 and conical mirror 23 of output axicon 22. The design and operational principles of unstable resonators are well known in the art and described in: A. E. Siegman, "Unstable Optical Resonators", Appl. Optics . . . , Vol. 13, pp. 353–367, Feb., 1974, all of which is incorporated herein by reference.

The end faces of the radial gain channels may be anti-reflection (AR) coated or alternatively an index-matching fluid may be placed between the channel ends and the resonator mirrors. Low loss resonator mirrors may be fabricated from dielectrically coated, water cooled, diamond machined Aluminum or Copper. The construction of such high power mirrors is well known in the art.

Figure 3:
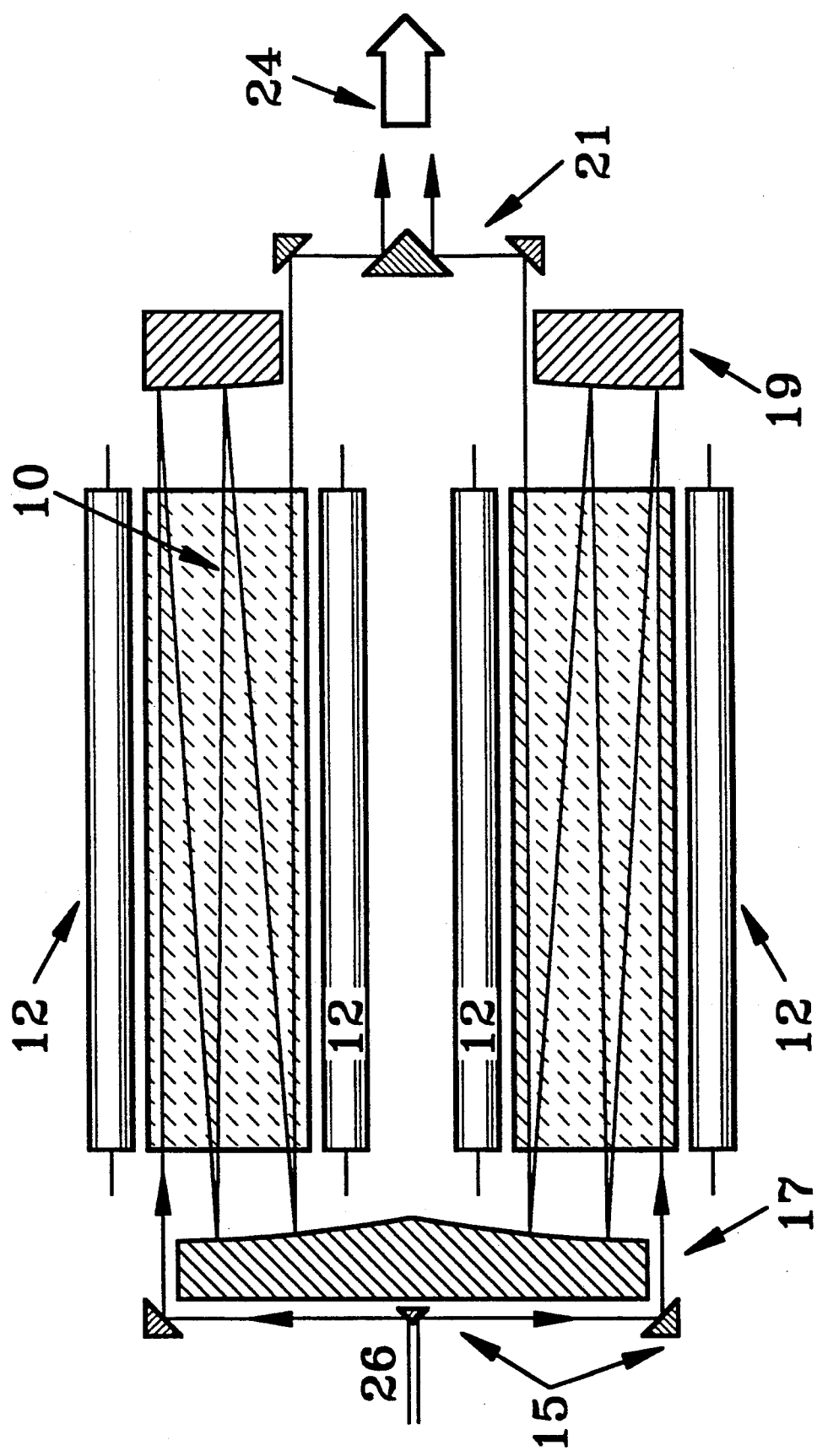
FIG. 3 is a plan view schematic diagram of a toric optical resonator for use with a radial laser system having provision for external reference oscillator injection for phase-locking.

In FIG. 3, toric mirrors 17 and 19 are placed at opposite ends of the gain sections to form a toric unstable resonator. An output axicon 27 formed of an annular mirror and a conical mirror as with the axicon 22 described in FIG. 2 is placed at one end of the gain channels.

In the toric unstable resonator, cavity rays "walk" radially inward over the surfaces of the toric mirrors 17 and 19, towards the central axis. As such, the toric geometry permits optical energy extraction from the central region of the structure near the device centerline, via the output axicon 27. Toric resonators are well known in the art and described in: T. R. Ferguson, Me. Smithers, "Toric Unstable Resonators", Appl. Opt., Vol. 23, pp. 2122–2126, Jul., 1984, all of which is incorporated herein by reference.

Although high average power can be extracted from the structures shown in FIGS. 2 and 3, without the introduction of an external reference oscillator, the individual beamlets so derived are not phase-locked. Consequently the combined output beam "brightness" does not benefit fully from beamlet stacking. This deficiency can be remedied through incorporation of an Injection Locking technique, as illustrated schematically above in FIGS. 2 and 3.

Under this condition the radial gain channels 10 now act essentially as a bank of parallel "super-regenerative" amplifiers for the injected reference oscillator signal 26. The concept of injection locking is well known in the art and described in: A. E. Siegman, "LASERS", University Science Books, Mill Valley, Calif., Chap. 29, pp. 1130–1162, 1990, all of which in incorporated herein by reference.

Injection locking is obtained by injection of an oscillator signal 26 into the resonator cavity. In the unstable resonator of FIG. 2, a hole is made at the center of primary mirror 16 for injection of an external reference oscillator signal 26, to affect injection-locking of the plurality of radial gain channels. In the toric resonator configuration of FIG. 3, simultaneous injection phase-locking of the individual gain channels can again be achieved by external reference oscillator injection 26. Whereas reference oscillator injection 26 is along the centerline in the normal unstable resonator it must be at the outer diameter of primary mirror 17 in the toric configuration. This aspect is accomplished in FIG. 3 by means of an "injection axicon" arrangement 15 consisting of an annular outer mirror and an inner conical mirror.

Figure 4:
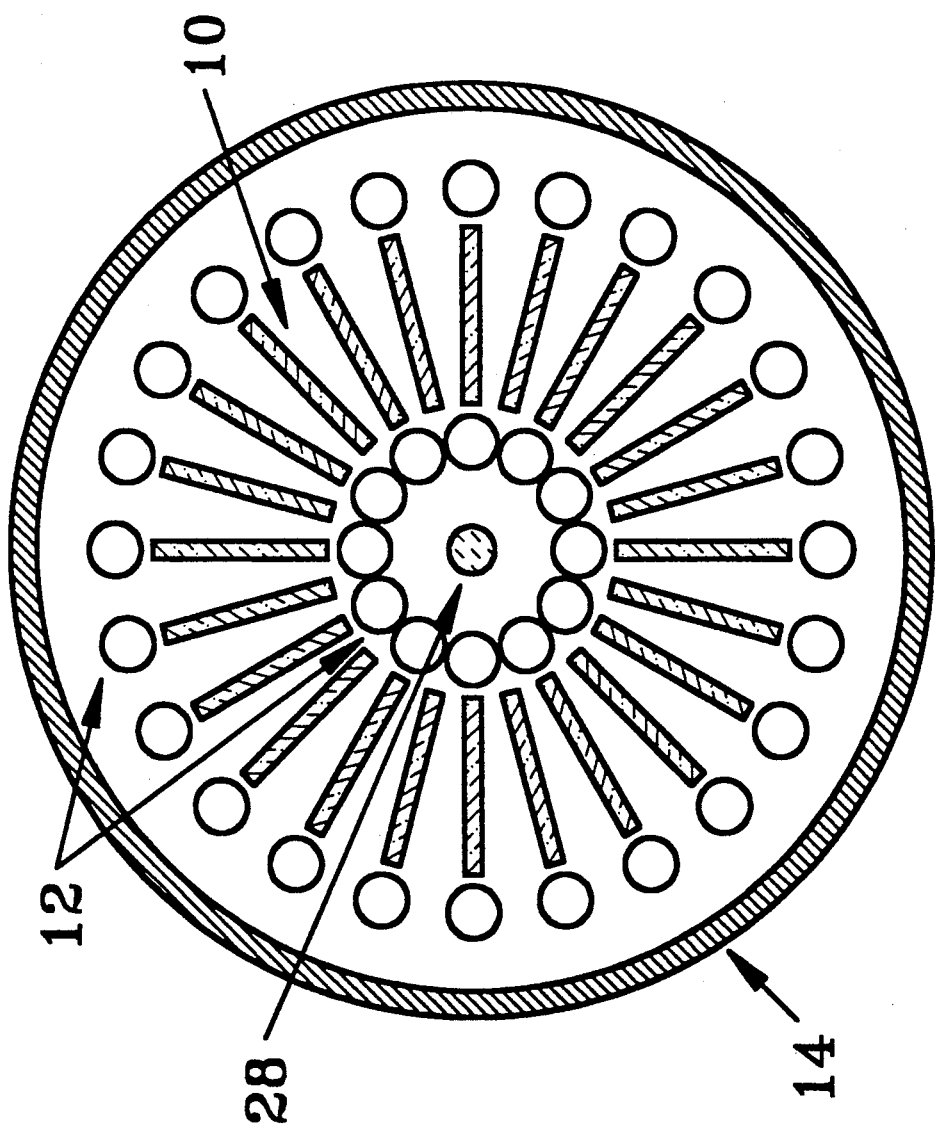
FIG. 4 is a cross-sectional schematic of a laser system having a plurality of radial gain channels and featuring a centrally mounted cylindrical gain section.
Figure 5:
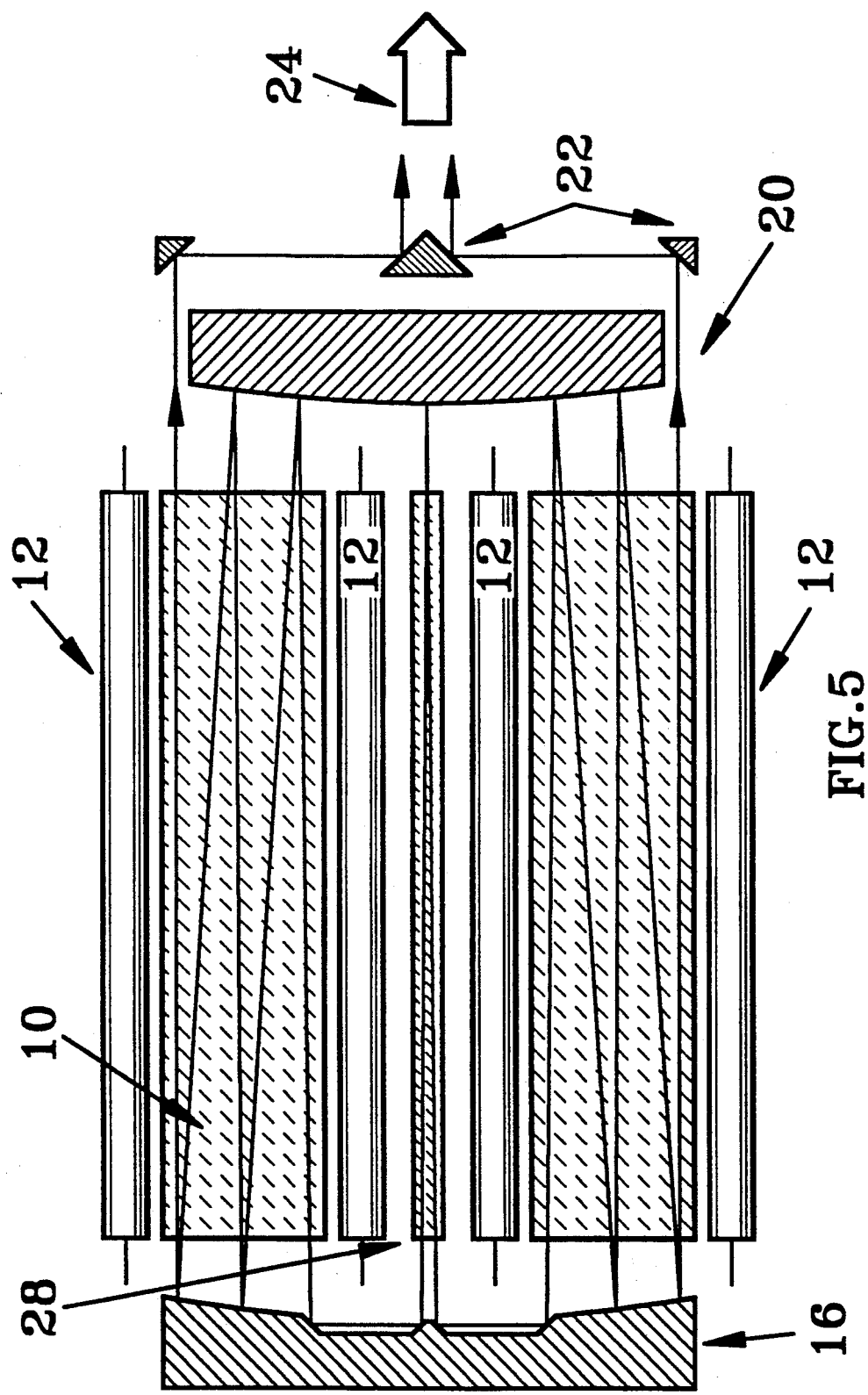
FIG. 5 is a plan view schematic diagram of an unstable resonator for an optically excited laser system having radial geometry and featuring provision for distributed coherent optical feedback from the centrally mounted cylindrical gain section, to provide a self-injection-phase-locking feature to the output beam.

Although in most previous MOPA configurations the reference oscillator signal required for injection-phase-locking is derived from a separate external laser source, this need not be the case here. Instead, the reference signal may be derived from within the same laser structure by mounting a cylindrical solid state gain section (rod) 28 at the centerline of the optical cavity. This configuration, illustrated in FIGS. 4 and 5, greatly simplifies system construction and in addition more easily permits optimum mode matching between the master oscillator (MO) and the power amplifier (PA) gain channels.

Optical pumping power applied to the central reference oscillator section may be reduced to an appropriate level required for high quality mode injection, by installation of a partially transparent cylindrical reflector (not shown) around the central laser rod 28. Alternatively, a partially transmitting reflecting coating may be applied directly to the outer surface of the central reference oscillator gain section 28.

Utilization of multi-channel phase-locking techniques can provide a phase-coherent high power laser output beam 24 of good optical quality. By way of example, past work has documented that laser extraction power densities of 25 w/cm$^3$ are readily achievable with Nd:Yag gain media. Thus, in a device having individual gain channels of dimensions 20 cm in length, 3 cm in height, and 5 mm in thickness, individual beamlet optical power extraction of about 700 w/channel is projected. Thus the 24 channel laser system depicted in FIG. 4 should provide a combined output laser beam power approaching 15 kilowatts, in either a pulsed or CW mode of operation.

It is apparent from the laser configurations, illustrated in FIGS. 1 through 5, that the optical paths through the amplifying media channels 10 are parallel to the cavity axis and thereby normal to the optical pumping radiation intensity from the flashlamps 12. Although this arrangement has proven adequate for moderate pumping levels, at the elevated pumping levels of current interest in "super" high average power solid state lasers, temperature induced refractive index variations generated transverse to the optical cavity mode can cause major phase perturbations. Such a condition leads to rapid degradation of the laser's optical output beam 24.

Figure 6:
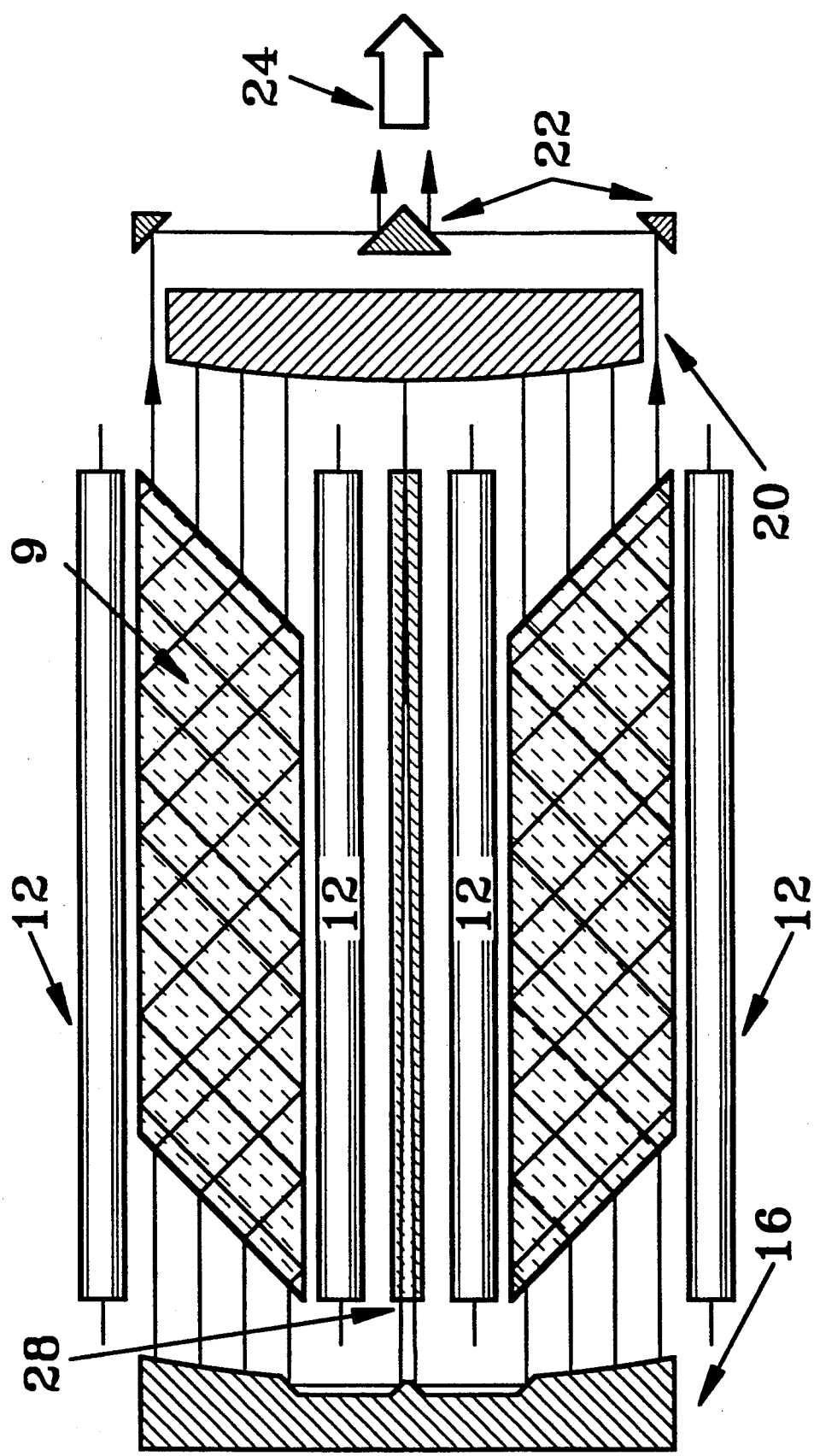
FIG. 6 is a plan-view schematic diagram of a self-injection-locked unstable resonator for use with an optically pumped Zig-Zag radial laser system, featuring a plurality of radially mounted gain channels, each with Brewster Angle end sections, in which the resonant optical beam paths describe a Zig-Zag mode of propagation through said individual radially mounted gain channels.

These beam power and quality limitations outlined above may be minimized through utilizing of a Zig-Zag method of cavity mode propagation through "Brewster Angle" solid state gain slabs 29 as shown in FIG. 6. In these slabs 29, the ends of the slabs are angled such that light propagating along the longitudinal axis of the slab is refracted at the end faces 31 and made to propagate in a zig-zag fashion with reflection off the interior walls of the slab. Under Zig-Zag mode propagation conditions and where the physical thickness of the individual gain channels is very small (of the order of 2 mm and smaller), while the effective intracavity gain length is very long (of the order of 100 times the thickness of the channels), cavity rays may propagate as guided-waves through the gain channels. This aspect can greatly relax construction and channel alignment tolerances. Under condition where heavy optical pumping of the broad faces of the slabs is achieved, it would be preferable to Zig-Zag in a direction perpendicular to the these larger faces.

The Zig-Zag concept has been well elucidated in the following publications: "The Potential of High Average-Power Solid State Lasers" by J. L. Emmett, W. F. Krupke and W. R. Sooy, Lawrence Livermore National Laboratory report # UCRL-53571 and UC-21,22: "Solid-State Laser Engineering", by Walter Koechner, Springer-Verlag Series in Optical Sciences, Chap. 7, Spring-Verlag, Berlin.

Figure 7:
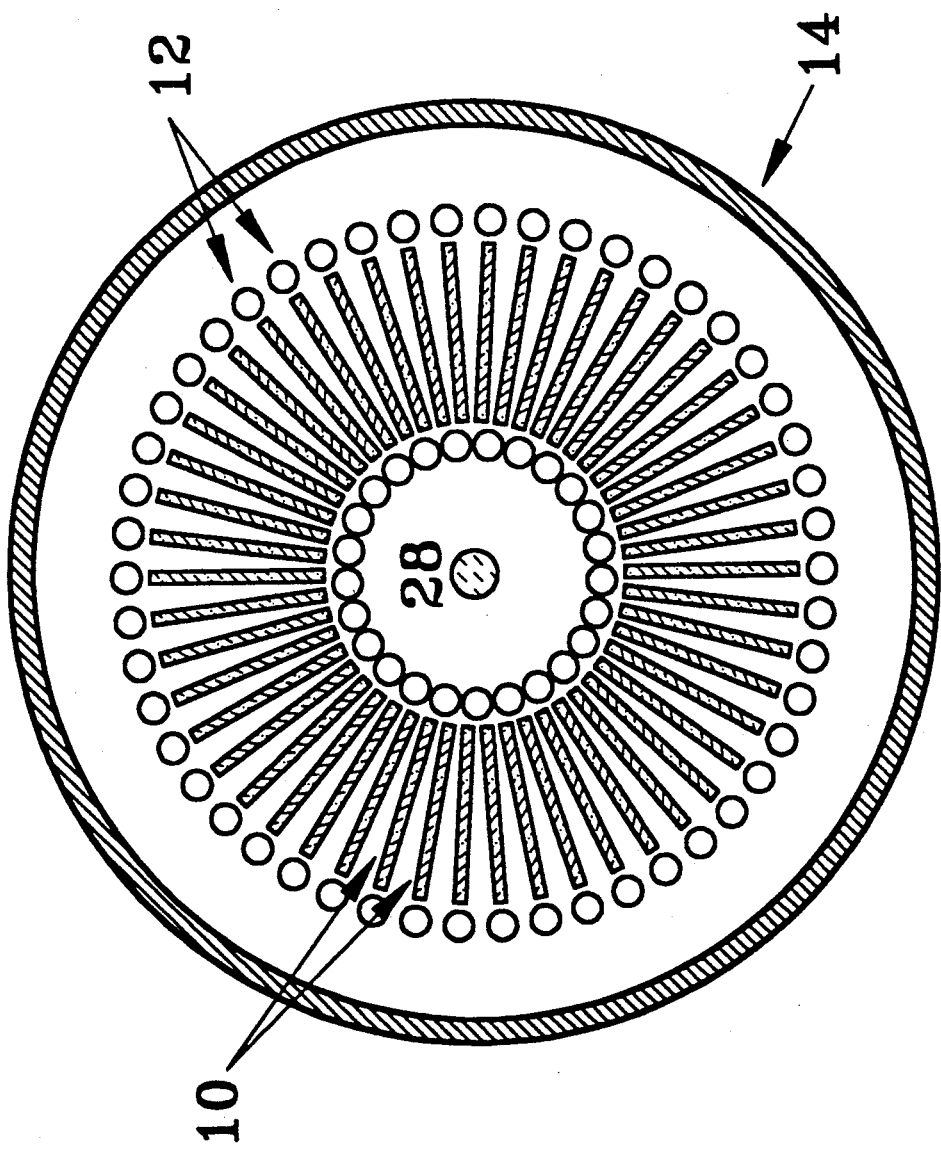
FIG. 7 is a cross-section schematic of a "higher" power Solid state radial laser having 50 radially mounted gain channels and a centrally mounted gain section for self-injection phase-locking of the powerful output beam.

It follows, that with the Solid State Zig-Zag laser geometry of FIG. 6, a high quality beam of very high average power level can be maintained. Utilization of a very large number of radial gain channels, such as the 50 channel configuration shown in FIG. 7, with a Zig-Zag geometry, should permit near diffraction limited laser energy extraction at the 30 kW average power level and in a comparatively small physical package.

Figure 8:
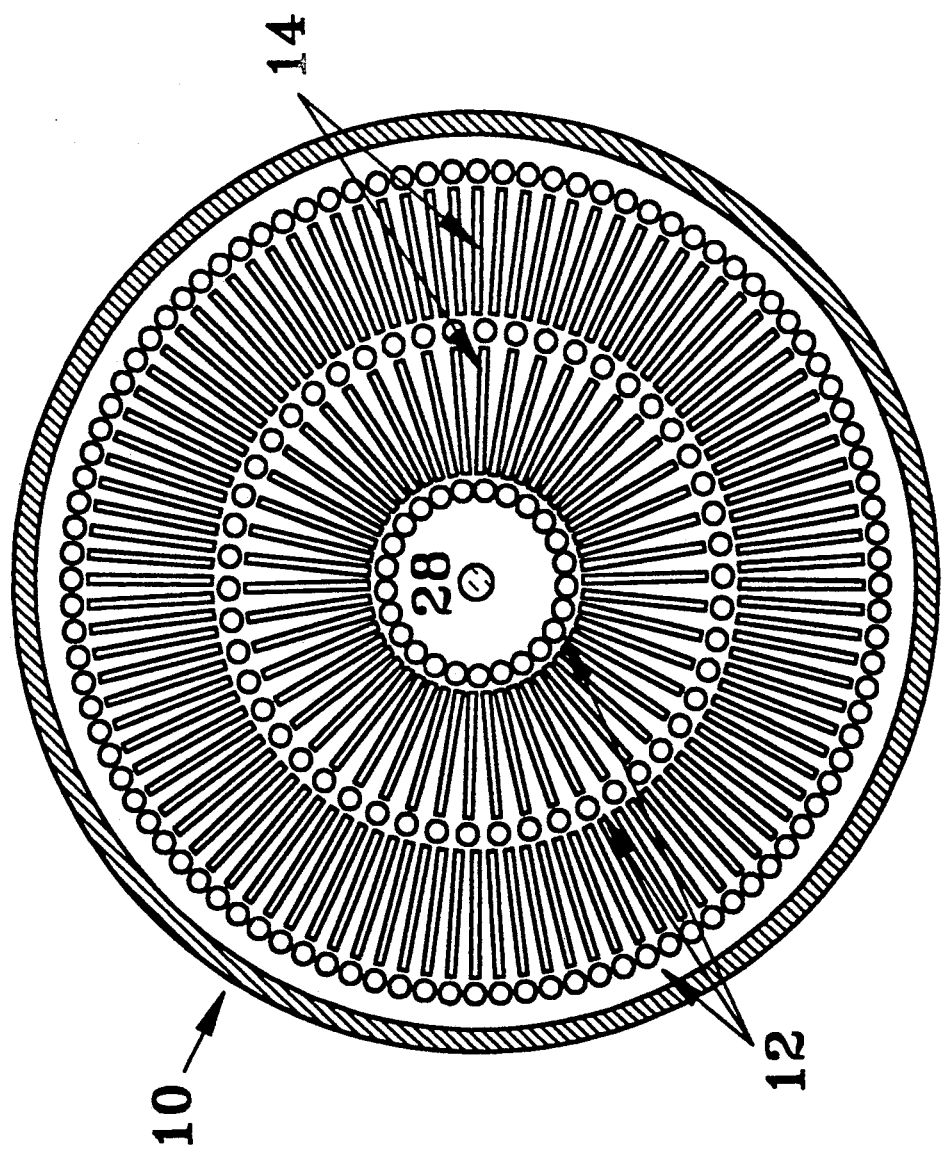
FIG. 8 is a cross-section schematic of a "super" high power Solid state radial laser having 2 concentric multichannel radial gain sections.
Figure 9:
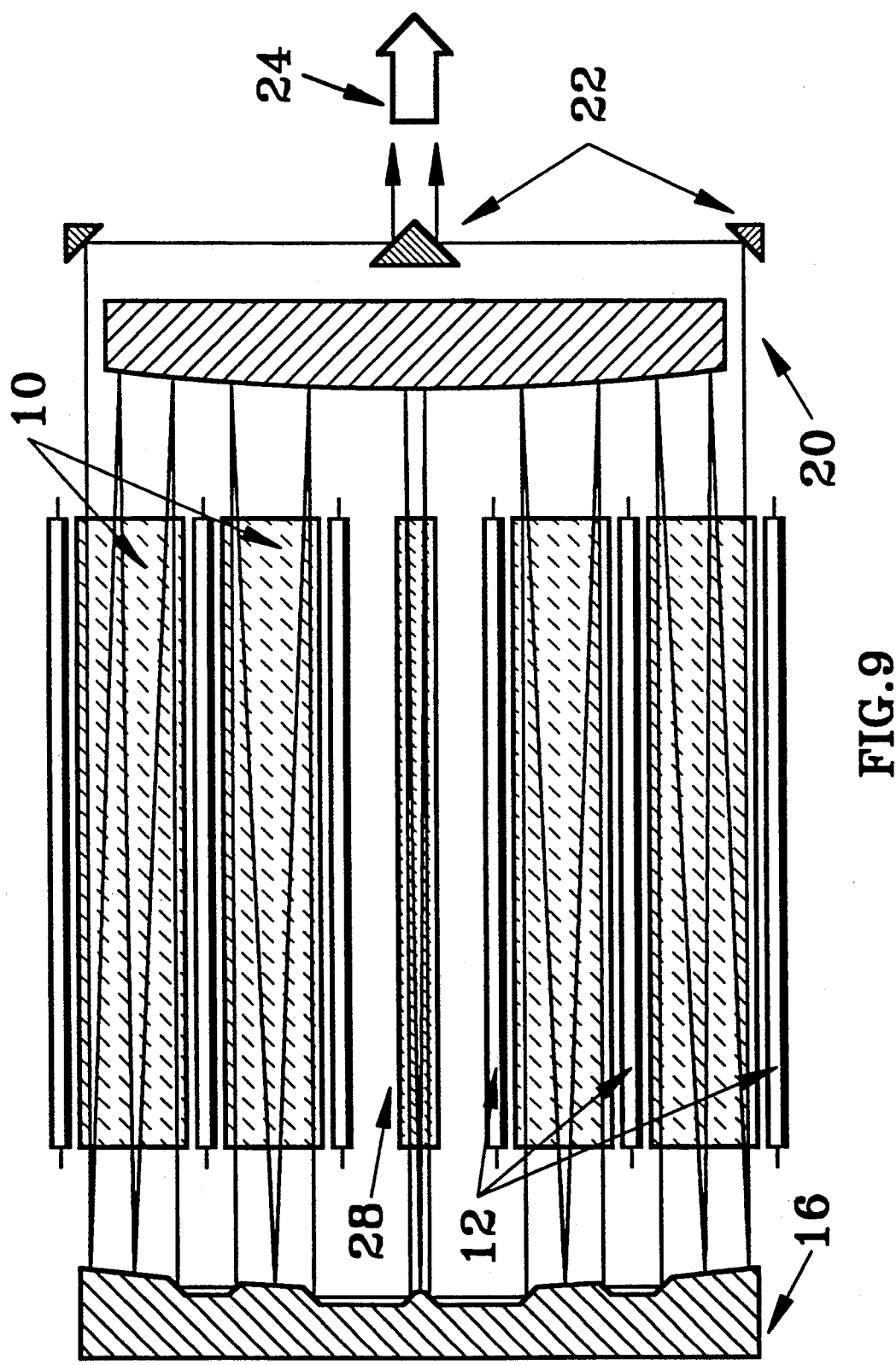
FIG. 9 is a plan view schematic of an unstable optical resonator for use with a Solid state radial laser having 2 concentric multi-channel radial gain sections.

It is possible to obtain even higher powers from such a solid state laser by constructing the device with several concentric multi-channel radial gain sections. Such a structure, employing two concentric gain sections is depicted in FIG. 8. FIG. 9 illustrates a modified unstable resonator used for optical energy extraction from such a device. Using the structure of FIG. 8, comprised of 150 gain channels, it should be feasible to obtain an average optical power output approaching 100 kW utilizing Nd:YAG as the slab active media.

Also by utilizing very thin gain material slabs, in the order of 3 mm thickness, heat transfer from the gain media into the surrounding cooling fluid can be greatly facilitated. Under such a condition, it may be feasible to substitute Nd:Glass as the gain media slabs, instead of single crystal Nd:YAG, particularly for lower rep rate pulsed operation. Such a scenario would permit a major decrease in the cost of fabrication and lead to a new generation of solid state lasers suitable for cost-effective industrial materials processing.

The basic geometry can in essence be applied to a very large number of radial gain channels comprising a single laser system, possibly up to several hundred. This aspect would yield a "Super High Power" solid state laser system, suitable for heavy-section industrial materials processing. The basic injection-locked multi-channel gain section with common unstable resonator mode concept outlined in this patent disclosure may be adapted to a wide selection of gain media, either solid or liquid and pumped by a variety of energy sources.

It will be appreciated that the invention has been described schematically and that the supporting structure of the gain channels has been omitted. Such features are a matter of choice to a person skilled in the art and may take any of various suitable forms, including plastic supports cast to an appropriate shape.

In a further embodiment, liquid gain media may be substituted for the solid state gain media, each gain section 10 being a chamber filled with liquid, the structure otherwise remaining the same as shown. For cooling, the liquid may be cooled by conduction cooling as for the solid state gain media or the liquid gain media may be recirculated through the gain section 10 to a heat exchanger (not shown, but well known in the art. The liquid may be a gain media such as a suitable dye in water, alcohol or a solvent. Due to difficulty of making the walls of the chamber parallel, the Zig-Zag approach to a liquid gain media may not be cost effective.

Also, the gain channels are illustrated with a rectangular cross-section, but may have other cross-sections suitable for cavity mode propagation such as a shape similar to the pie-shaped region shown in FIG. 1. However, such a cross-section would not allow zig-zag propagation.

A person skilled in the art could make immaterial modifications to the invention described and claimed in this patent without departing from the essence of the invention.

I claim:

1. A laser system having a first set of plural solid state gain channels mounted within an enclosure, each individual gain channel being conduction cooled by means for cooling the gain channels, means adjacent each gain channel for providing laser excitation energy to material within the gain channel, characterized in that:
   the solid state gain channels are arranged about and extend radially from a first common central axis, and have optical extraction means having a second central axis coincident with the first common central axis disposed about the gain channels for producing a common resonator mode for all of the gain channels and for extracting laser energy from all of the gain channels simultaneously; and further including
   phase lock means for providing phase-locking of the laser energy extracted simultaneously from the gain channels.

2. The laser system of claim 1 in which the optical extraction means includes an optical resonator having a common unstable cavity mode with annular positioned beamlet output, one from each gain channel, and further including an output compacting axicon, mounted to receive the combined annular positioned beamlet outputs from each of the individual gain channels.

3. The laser system of claim 2 in which the phase lock means includes means for external reference oscillator injection, thereby providing injection phase locking of the individual beamlets extracted from the gain channels.

4. The laser system of claim 1 in which the gain channels are mounted in a toric resonator with optical beamlet outputs taken at about the central axis of the laser system, and further including means for compacting the individual beamlets into an annular output beam.

5. The laser system of claim 4 in which the phase lock means includes means for external reference oscillator injection, thereby providing injection phase-locking of the individual beamlets extracted from the gain channels.

6. The laser system of claim 1 in which the phase lock means includes an independent cylindrical gain section mounted at the common central axis, means for optical pumping the central gain section and extracting coherent optical radiation from said central gain section, and means for feeding-back a portion of the coherent laser output from the central gain section into each of the radially mounted rectangular gain channels, thereby simultaneously providing self-injection phase-locking of the gain channels.

7. The laser system of claim 1 in which the plural gain channels are provided with Brewster Angle end sections so as to support a Zig-Zag optical path propagation mode in each gain channel, and in which the phase lock means includes optical resonator means for providing self-injection phase-locked laser beam extraction.

8. The laser system of claim 1 in which the plural gain channels have a ratio of length to thickness that promotes a wave-guide mode of cavity ray propagation within the gain channels.

9. The laser system of claim 8 in which the ratio of length to thickness of the gain channels is greater than about 100.

10. The laser system of claim 1 having a second set of plural solid state gain channels disposed radially outward of the first set of gain channels, the second set of gain channels being arranged about and extending radially from the first common central axis.

11. The laser system of claim 1 in which the gain channels each have a thickness of less than about 5 mm.

12. The laser system of claim 11 having a second set of plural liquid gain channels disposed radially outward of the first set of gain channels, the second set of gain channels being arranged about and extending radially from the first common central axis.

13. A laser system comprising:
a first set of plural gain channels containing liquid gain media, the gain channels being mounted within an enclosure;
each individual gain channel being cooled by means for cooling the gain channels;
means adjacent each gain channel for providing laser excitation energy to the liquid gain media;
the liquid gain channels being arranged about and extending radially from a first common central axis;
optical extraction means having a second central axis coincident with the first common central axis disposed about the gain channels for creating a common resonator mode for all of the gain channels and for extracting laser energy from all of the gain channels simultaneously; and
phase lock means for providing phase-locking of the laser energy extracted simultaneously from the gain channels.

14. The laser system of claim 13 in which the optical extraction means includes an optical resonator having a common unstable cavity mode with annular positioned beamlet output, one from each gain channel, and further including an output compacting axicon, mounted to receive the combined annular positioned beamlet outputs from each of the individual gain channels and thereby providing a single combined annular output laser beam of uniform intensity profile at high average power level.

15. The laser system of claim 14 in which the phase lock means includes means for external reference oscillator injection, thereby providing injection phase-locking of the individual beamlets extracted from the gain channels.

16. The laser system of claim 13 in which the gain channels are mounted in a toric resonator with optical beamlet outputs taken at about the central axis of the laser system, and further including means for compacting the individual beamlets into an annular output beam.

17. The laser system of claim 16 in which the phase lock means includes means for external reference oscillator injection, thereby providing injection phase-locking of the individual beamlets extracted from the gain channels.

18. The laser system of claim 13 in which the phase lock means includes an independent cylindrical gain section mounted at the common central axis, means for optical pumping the central gain section and extracting coherent optical radiation from said central gain section, and means for feeding-back a portion of the coherent laser output from the central gain section into each of the radially mounted rectangular gain channels, thereby simultaneously providing self-injection phase-locking of the gain channels.

19. The laser system of claim 13 in which the plural gain channels are provided with Brewster Angle end sections so as to support a Zig-Zag optical path propagation mode in each gain channel, and in which the phase lock means includes optical resonator means for providing self-injection phase-locked laser beam extraction.

20. The laser system of claim 13 in which the plural gain channels have a ratio of length to thickness that promoted a wave guide mode of cavity ray propagation within the gain channels.

* * * * *